April 22, 1941.  C. BURTON ET AL  2,239,077
RESILIENT CAR WHEEL
Filed July 20, 1939  2 Sheets-Sheet 1

Inventors:
CARROLL BURTON and
DOUGLAS P. STEWARD.
by: John E. Jackson
their Attorney

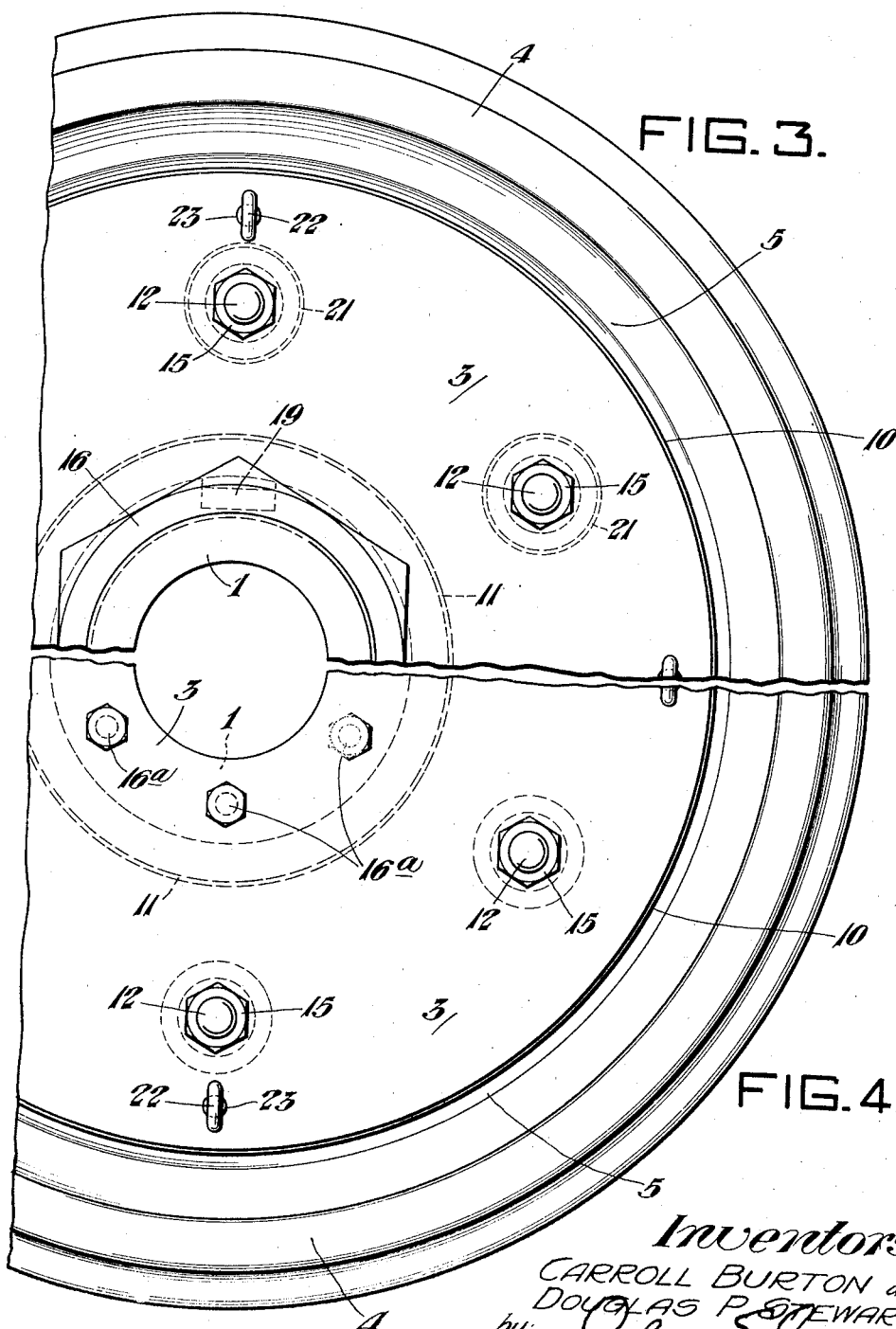

Patented Apr. 22, 1941

2,239,077

UNITED STATES PATENT OFFICE 2,239,077

RESILIENT CAR WHEEL

Carroll Burton and Douglas P. Steward,
Johnstown, Pa.

Application July 20, 1939, Serial No. 285,629

2 Claims. (Cl. 295—11)

This invention relates primarily to wheels employed with rail borne vehicles and to new and improved methods of resisting radial and torsional movement of the several parts of the wheel assembly with reference to each other, without which means the resilient feature of the wheel could not function efficiently in reducing the noise and the shocks normally transmitted from rail through wheel to axle and truck.

Heretofore, resilient wheels of the prior art have embodied resilient members held between rigid members in some convenient way. Such constructions, however, were not positive in maintaining proper assembly conditions as they depended largely on metal to metal friction, or rubber to metal, induced by assembly pressure which latter varied from temperature assemblies or inaccurate sizing of the component parts of the wheel. It is true that good results could be otbained by very close part tolerances, but such were costly and impracticable to produce commercially.

In addition, it is to be further understood that the abutting contact, in such constructions, of metallic parts with resilient members, produced a condition of easy braking heat transfer through the metallic parts to the resilient members with the result that said resilient members deteriorated easily from such excessive heat.

One of the objects of our invention is to provide means whereby a uniformly distributed assembly pressure can be applied to the wheel over the area of the resilient members which will not be affected by conditions of climatic temperature variations. Another object is to provide means whereby radial movement of the several wheel parts, one with another, will be positively prevented. A third object is to provide methods of preventing rotatable movement of the wheel parts, one with another. Still another object is to incorporate means whereby the transfer of excessive braking heat will be eliminated to the point at which it will not be of a damaging nature.

These and other objects will be apparent to those skilled in the art when considered in conjunction with the following drawings, in which:

Figure 3 is a side elevation of the wheel as shown in Figure 1;

Figure 4 is a side elevation of the wheel as shown in Figure 2;

Figure 1:
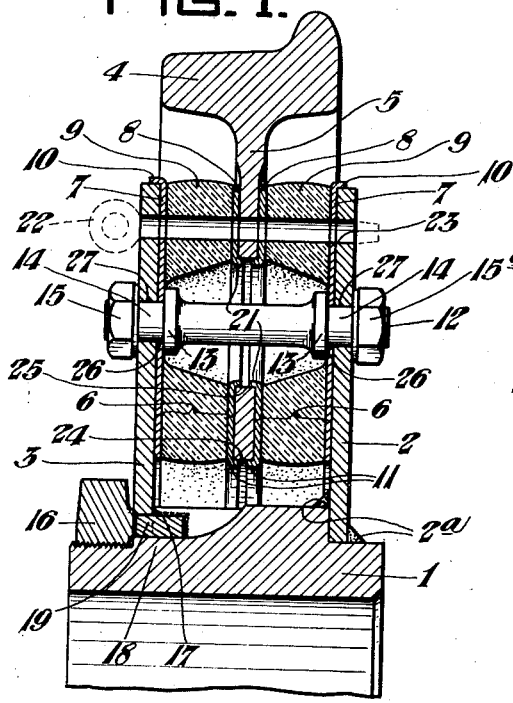
Figure 1 is a section through half of the wheel.

Referring to the above drawings, Figure 1 depicts a section through the wheel, in which the hub 1 is bored for a press fit onto an axle and is designed to turn therewith. The hub 1 carries two transversely spaced disks 2 and 3, the disk 2 being made integral with the hub 1 by the welded joint 2a shown or by being cast or forged integral with the same. The disk 3 is a loose member designed to fit closely over the hub shank 18, against the shoulder 17 and also over a hub key 19 so as to eliminate turning movement of the disk 3 with reference to other wheel parts. The disk 3 is held in place against the shoulder 17 by the hub nut 16. Both disks are provided with axially aligned spaced holes through which the shanks 14 of the separator bolts 12 pass to hold the assembly in rigid compressed condition.

The wheel is provided with a rim 4 having an integral rim web 5 and also has a center hole 24 which is disposed between and spaced from the disks 2 and 3.

Between the rim web 5 and the disks 2 and 3 are located annular resilient members 6 which are composed of a core of resilient material 9 and outer and inner face plates 7 and 8 respectively, both of which are securely bonded to the resilient core 9. The face plates 7 have their outer peripheries formed with outturned flanges 10 which are so dimensioned as to closely contact the outer peripheries of the disks 2 and 3. The inner face plates 8 have their inner peripheries formed with face plate flanges 11 which are so dimensioned as to closely contact the edges of the center hole 24 in the rim web 5.

The face plate flanges 10 and 11 serve to aid in centering the resilient members 6 with reference to the disks 2 and 3, as well as with the face of the web 5, thereby ultimately making the face of the rim 4 concentric with the hub bore. In addition, face plate flanges 10 and 11 aid in resisting radial movement of the resilient members 6 with reference to the disks 2 and 3 and the rim web 5.

The coaxially opposite resilient members 6 are provided with a plurality of oppositely spaced holes in their outer face plates 7 which closely contact the shanks 14 of the separator bolts 12 in order to resist torsional movement of the disks 2 and 3 with reference to resilient members 6.

Figure 5:
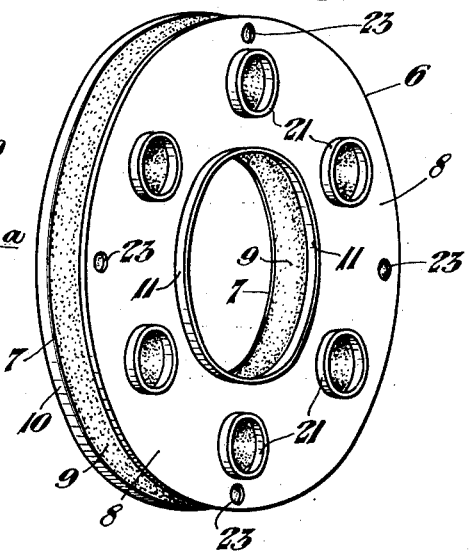
Figure 5 is a perspective view of the resilient member indicated in Figure 1.

As indicated in Figures 1 and 5, the rim web 5 is provided with a series of holes 25 whose centers coincide with holes 26 in outer face plates 7 and holes 27 in the disks 2 and 3 and into which fit, with close tolerance, annular shaped face plate tubes 21 which are integral with the inner face plates 8. By this means torsional movement of the rim web 5 and, consequently, the rim 4 with reference to the resilient members 6, is prevented.

Separator bolts 12 are provided at each end with integral collars 13 which contact the inner faces of the outer face plates 7, so that when pressure from the shoulder bolt nuts 15 is applied, the outer face plates 7 will be tightly pinched between the collars 13 and the disks 2 and 3, thereby minimizing any chance for movement between resilient members 6 and the disks 2 and 3. The shoulder bolts 12 also, by the accurately spaced collars 13, insure uniform pressure on the resilient members 6 when the wheel is properly assembled.

Figure 2:
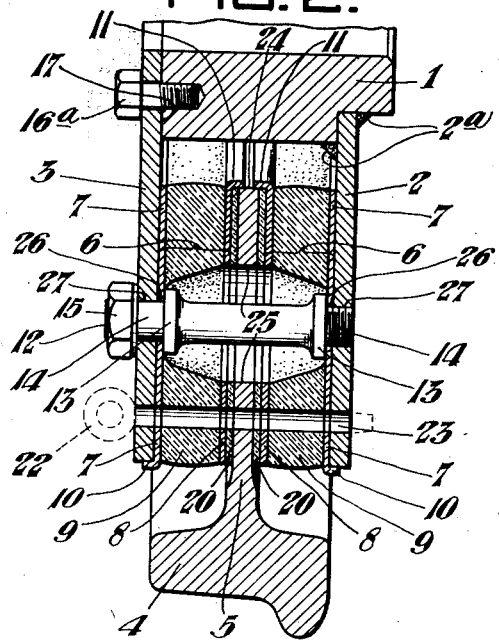
Figure 2 is a section through half of the wheel showing an alternative construction.
Figure 6:
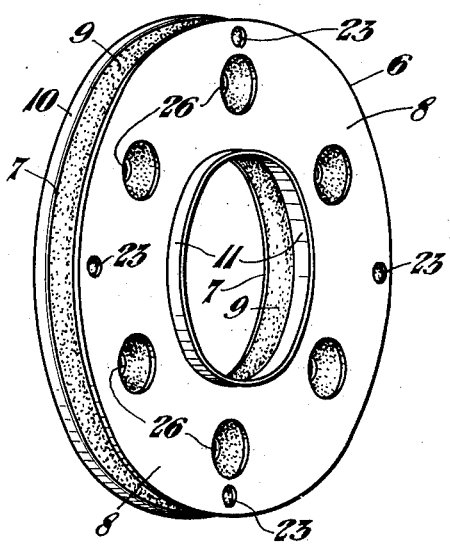
Figure 6 is a perspective view of the resilient member shown in Figure 2.

In Figures 2 and 6 an alternative construction is shown in which the inner face plate tubes 21 have been eliminated and annular discs of suitable non-metallic friction material 20 substituted therefor, said friction material 20 being located on each side of the rim web 5 and between it and the inner face plates 8. The function of the friction material 20 is dual in that it eliminates, when coupled with proper assembly pressure, torsional movement between the rim web 5 and resilient members 6, and also minimizes the transfer of heat generated by braking on the rim 4, from the rim web 5 to resilient members 6. The latter claim is based on the fact that most efficient friction materials, of non-metallic composition, have certain heat insulating values. However, in order to insure proper rotatable assembly, it is advantageous to provide a plurality of accurately located assembly holes 23 which extend through all members of the assembly from side to side, into which aligning pins 22 can be inserted with close fit when the wheel is assembled. These pins can also be employed for the purpose of holding the wheel parts in accurate alignment in both constructions shown in Figure 1 and Figure 2, when it becomes necessary to true up the rim by machining or grinding without the necessity of dismantling the same.

Figure 2 illustrates a slight modification with respect to the means for securing the bolt 12 to the disk 2. As illustrated at the right hand side of Figure 2, the right extremity of the bolt 12 is screwed into a tapped hole in the disk, thus eliminating the nut 15a at the right in Figure 1. A further modification of Figure 2 is that instead of using the nut to clamp the disk 3 against a shoulder on the hub, the hub is shortened and a smaller hole is made in the inner portion of the disk so that the inner face thereof abuts the adjacent face of the hub and a series of cap screws 16a are provided to secure the disk to the hub.

When the wheel is used in streetcar service or in other railway service wherein current is conducted through the rails over which the wheel travels, suitable flexible electric connections will be provided for properly conveying current through the rim 4 via the web 5 to the hub 1, which is assembled in electrically conducting relation with the usual car axle. From the foregoing it is apparent that our invention provides detail features of wheel construction. Inherent advantages of the construction are that the parts can be easily and quickly fabricated. Most of the metallic parts, such as the outer disk-like plates, as well as the face plates for the resilient members, are formed of flat plate stock which can be easily and quickly stamped out, the flanges of certain of which can be readily formed in conventional types of forming presses utilizing suitable dies. Thus the assemblage can be economically produced without sacrificing strength characteristics and, at the same time, provide the improved characteristic features hereinabove set forth.

We claim:

1. A wheel of the character having an outer rim with an inwardly extending web, a hub having a disk fixedly secured near one end thereof, said hub having a shoulder, a second disk keyed to the hub and clamped against said shoulder, an annular resilient member disposed between the first mentioned disk and said web, a similar annular resilient member disposed between said web and the second named disk, the said web having an axial opening therein of materially larger diameter than the portion of the hub which it surrounds, said web having a series of spaced holes therein, each of said resilient members including an inner web engaging face plate provided with an inturned flange overlapping and snugly engaging the wall of said central axial opening, each resilient member also having an outer face plate provided with an outturned peripheral flange overlapping and firmly engaging the outer edge of the outer disk adjacent thereto, a resilient core for each resilient member disposed between the respective inner and outer face plates thereof, the inner face plate of each resilient member having tubular extensions projecting into the said holes of the web, bolts extending through the tubular extensions and piercing the outer face plates and the outer disks, said bolts having shoulders whose outer faces engage the inner faces of the outer face plates, and means coacting with said bolts compressively holding said cushion elements in assembled relation with the face plates, the central web and the outer disks.

2. The combination with a wheel having an outer rim with an inwardly extending centrally apertured web, a hub extending through the aperture and carrying spaced disks, of a pair of resilient units each comprising an annular body of compressible material located between spaced metallic face plates, one of which has an outer peripheral flange for engagement with one of said disks and the other of which has an inner flange for engagement with the edge of said aperture, shouldered bolts passing freely through said web and resilient units, and carrying means effective to hold the resilient units in compressed relation with said web and said spaced disks, the wheel being further characterized in that the apertured web is formed with a series of holes and said face plates are each formed with a series of holes opposite those of the web, the inner face plate holes having sleeve extensions engaging the web holes, and said bolts passing freely through said sleeve extensions of the inner face plates but tightly engaging the holes of the outer face plates.

CARROLL BURTON.
DOUGLAS P. STEWARD.